March 23, 1948.  E. A. PRICE  2,438,229
PENDULOUSLY OPERATED CRANK TIMING INDICATOR
Filed Dec. 4, 1944
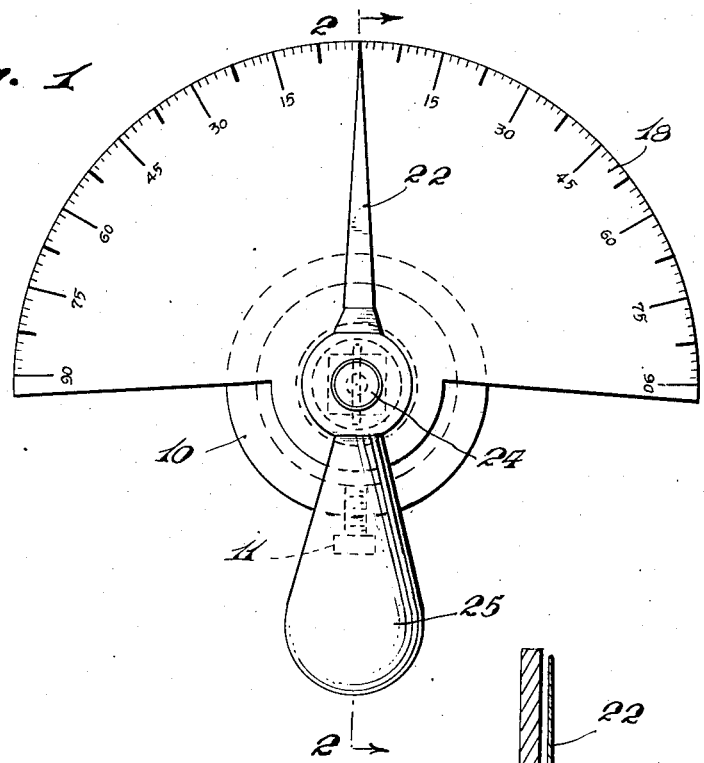
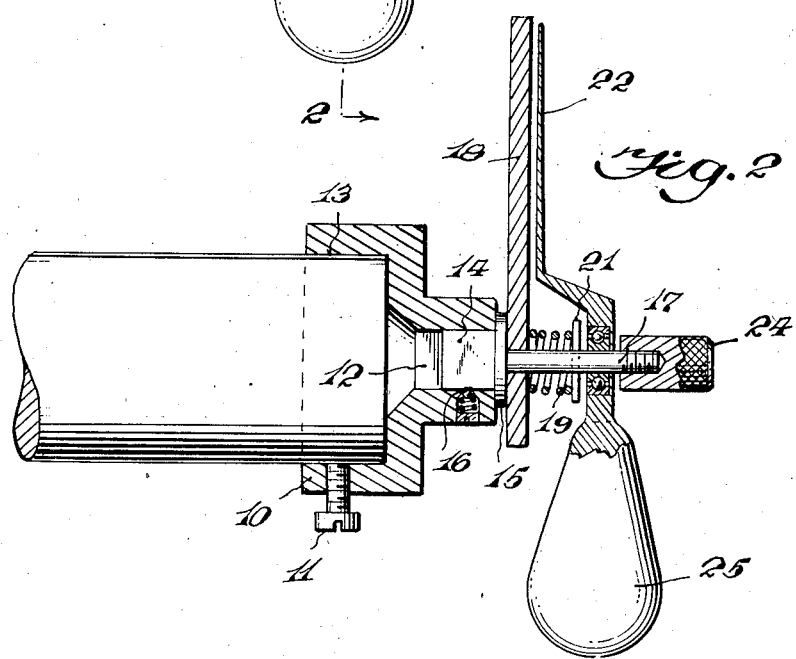
Inventor
Eugene A. Price,
By H. E. Ruth
Attorney Patented Mar. 23, 1948

2,438,229

UNITED STATES PATENT OFFICE 2,438,229

PENDULOUSLY OPERATED CRANK TIMING INDICATOR

Eugene A. Price, Spokane, Wash.

Application December 4, 1944, Serial No. 566,489

1 Claim. (Cl. 33—215)

The present invention relates to improvements in protractors and has more direct reference to a novel protractor adapted to uses such as the measurement of the angular position of the crank shaft of an internal combustion engine. It is contemplated that one of the greatest fields of usefulness for the device will be in connection with timing of internal combustion engines, although it is not limited in this respect and may also be used for determining and adjusting the limits of movement of any type of rotating or oscillating shaft. A typical example of another use might be the adjustment of the throw of a carburetor throttle, lever or aircraft mixing valve control.

In timing an internal combustion engine, for example, it is necessary to be able to determine the exact angular position of the crank shaft so that the ignition system may be set to fire the combustible mixture within a cylinder at a certain precise moment before the connecting rod and crank shaft reach dead center position. The dead center position of the motor can ordinarily be determined by observing a timing mark placed on the motor at time of manufacture, or in the absence of such a timing mark, by determining the extreme upper piston position in a cylinder by an indicator screwed into one of the spark plug holes.

The proper number of degrees of advance will vary to a certain extent with motors of different types, but since the optimum setting for any given type of motor is known, the problem becomes one of accurately measuring the rotation of the crank shaft with respect to a fixed setting corresponding to the dead center position of one of the cylinders.

The present invention provides a simple, compact and dependable means for measuring the rotation of a shaft by the combination of a pair of relatively rotatable protractor indicating members, means to secure these to the end of a shaft, gravity controlled means for maintaining one of these members in constant position, and a shiftable friction clutch to facilitate setting the other indicating member to zero position and to cause it to move in response to movements of the shaft.

Referring now more particularly to the drawings attached to and forming a part of the present specification, Figure 1 is a front elevational view of a protractor chosen as illustrative of the principles of this invention.

Figure 2 is a detail sectional view taken substantially on the plane of the line 2—2 of Fig. 1.

The entire protractor structure is mounted on one end of a shaft to be measured by fitting an adaptor 10 over the end of the shaft and securing it to the shaft by suitable means such as the set screw 11. The adaptor 10 is provided with a square socket 12 and it is contemplated that various sizes and shapes of the adaptors may be provided having internal openings 13 of round, square or hexagonal shape so that they may be conveniently fitted to any desired type of shaft. The working parts of the protractor are carried by a square plug 14, frictionally held having an outer flange 15 and in the socket 11 by a spring pressed ball detent 16. The plug 14 carries a stub shaft 17 on which a protractor dial 18 is mounted. The dial 18 is freely rotatable on the shaft 17 but a light coil spring 19 is positioned on the shaft between the outer face of protractor dial and a cross pin 21 to urge the dial against the flange 15 and thus maintain frictional engagement between the shaft 17, the plug 14, and the protractor dial. A pointer 22 is carried on an anti-friction bearing 23 on the stub shaft 17 between the cross pin 21 and the outer knurled head 24, which is threaded or otherwise secured to the extremity of the stub shaft 17. The pointer 22 is provided with a plumb weight 25 to maintain the pointer 22 in exact vertical position by gravity.

In operation of the protractor assembly, the protractor is affixed to any given shaft and with the shaft in a known position the dial 18 is manually shifted so that its zero marking coincides with the position of the indicator pointer 22. The shaft 14 may then be revolved in either direction and since the pointer 22 will remain in constant position by force of gravity, the degree of clockwise or counter clockwise movement of the shaft may be read on the protractor dial. Thus the pointer and the dial comprise a pair of mated indicating members, so related that the pointer will be maintained in a constant position, although it will be obvious that identical results could be obtained by controlling the position of the dial by the plumb weight, and moving the pointer in response to rotation of the engine shaft. Also, in the form of the invention illustrated in the drawings, the protractor dial has been illustrated as extending thru an arc of 90 degrees on either side of the zero position, although it will be obvious that the angular extent of the dial may be made to extend thru 360 degrees if desired, or that various other modifications and variations may be indulged in without departing from the inventive thought here disclosed.

It is accordingly requested that the scope of the invention shall not be regarded as limited to the exact structure illustrated in the drawings, but shall extend to any and all modifications coming within the terms of the appended claim.

Having thus described my invention, what I claim as new and desire to secure by Letters Patent is:

An instrument for indicating the amount that a rotatable device is turned from its original position, comprising, a supporting plug for attachment to the device, a shoulder on said plug, a dial, a shaft projecting through the dial from said plug, a coiled spring secured on the projecting shaft and pressing the dial against the shoulder thereby frictionally opposing rotation of the dial on the shaft, a pointer having a plumb weight thereon, an antifriction bearing mounting the pointer on the projecting shaft beyond the spring and a head on the end of the projecting shaft for turning the shaft.

EUGENE A. PRICE.

REFERENCES CITED

The following references are of record in the file of this patent:

UNITED STATES PATENTS

| Number | Name | Date |
|---|---|---|
| 949,842 | Pugh | Feb. 22, 1910 |
| 1,241,469 | Payne | Sept. 25, 1917 |
| 1,533,975 | Dene | Apr. 14, 1925 |
| 2,090,020 | Ballou | Aug. 17, 1937 |

FOREIGN PATENTS

| Number | Country | Date |
|---|---|---|
| 20,929 | Great Britain | 1907 |